United States Patent
Lionello (10) Patent No.: US 9,261,644 B2
(45) Date of Patent: Feb. 16, 2016

(54) STABILIZING APPARATUS FOR TREMOLO SYSTEM FOR STRING INSTRUMENT

(75) Inventor: Scott Nicholas Dante Lionello, Tsawwassen (CA)

(73) Assignee: Scott Nicholas Dante Lionello, Tsawwassen, BC (CA)

(*) Notice: Subject to any disclaimer, the term of this patent is extended or adjusted under 35 U.S.C. 154(b) by 0 days.

(21) Appl. No.: 14/131,831

(22) PCT Filed: Jul. 11, 2012

(86) PCT No.: PCT/CA2012/050477
§ 371 (c)(1),
(2), (4) Date: Aug. 28, 2014

(87) PCT Pub. No.: WO2013/006976
PCT Pub. Date: Jan. 17, 2013

(65) Prior Publication Data
US 2015/0003772 A1   Jan. 1, 2015

Related U.S. Application Data

(60) Provisional application No. 61/506,644, filed on Jul. 12, 2011.

(51) Int. Cl.
*G01D 3/00* (2006.01)
*G02B 6/02* (2006.01)
(Continued)

(52) U.S. Cl.
CPC ........ *G02B 6/02057* (2013.01); *G02B 6/02071* (2013.01); *G02B 6/0288* (2013.01); *G02B 6/02095* (2013.01); *G02B 6/02295* (2013.01); *G02B 6/14* (2013.01); *G02B 6/26* (2013.01); *G02B 6/268* (2013.01); *G02F 1/0115* (2013.01); *H01S 3/0675* (2013.01);
(Continued)

(58) Field of Classification Search
CPC ........... G02B 6/02057; G02B 6/02071; G02B 6/02095; G02B 6/02295
USPC .......................................................... 84/313
See application file for complete search history.

(56) References Cited

U.S. PATENT DOCUMENTS 2,741,146 A   4/1956   Fender
4,823,669 A   4/1989   Sarricola, Jr.
(Continued)

FOREIGN PATENT DOCUMENTS

CA   2676726 A1   3/2011

OTHER PUBLICATIONS

Dec. 6, 2010 Internet Archive of blog posting "The Last Word in Tremolo Stabilization" published at www.Joe.Emenaker/TremStabilizers/.
(Continued)

*Primary Examiner* — Jianchun Qin
(74) *Attorney, Agent, or Firm* — Antoinette M. Tease (57) ABSTRACT

The present invention relates to a method and apparatus for stabilizing a tremolo system in a string instrument, the tremolo system having a block and a number of tensioners in extension from the block. One aspect of the invention includes an apparatus, mountable to the string instrument, and having a first retainer to engage a first one of the tensioners and a second retainer to engage a second one of the tensioners, wherein the first retainer is closer to the block than is the second retainer when the apparatus is mounted to the string instrument.

19 Claims, 6 Drawing Sheets

(51) Int. Cl.
*G02B 6/14* (2006.01)
*H01S 3/067* (2006.01)
*G02B 6/028* (2006.01)
*G02B 6/26* (2006.01)
*G02F 1/01* (2006.01)
*H01S 3/094* (2006.01)
*H01S 3/30* (2006.01)

(52) U.S. Cl.
CPC ...... *H01S 3/06758* (2013.01); *H01S 3/094007* (2013.01); *H01S 3/302* (2013.01); *H01S 2301/20* (2013.01)

(56) References Cited

U.S. PATENT DOCUMENTS

| | | | |
|---|---|---|---|
| 4,928,564 A | 5/1990 | Borisoff et al. | |
| 5,127,298 A | 7/1992 | Snape et al. | |
| D356,328 S | 3/1995 | Pozzobon | |
| 5,515,761 A | 5/1996 | Sides | |
| 5,522,298 A | 6/1996 | Schaller et al. | |
| 5,539,144 A | 7/1996 | Sherman | |
| 6,040,511 A * | 3/2000 | Hall | 84/313 |
| 6,552,252 B2 | 4/2003 | Hirayama | |
| 6,919,501 B2 | 7/2005 | Burton | |
| 6,943,284 B2 | 9/2005 | Didan | |
| 7,189,908 B2 | 3/2007 | Lavineway | |
| 7,427,703 B2 | 9/2008 | Geier | |
| 2004/0000224 A1 | 1/2004 | Dam | |
| 2005/0160897 A1 | 7/2005 | Hirayama | |

OTHER PUBLICATIONS

May 5, 2012 Internet Archive of Feb. 16, 2012 blog posting "Review: Super-Vee-Mag-Lok Temolo Anti-Deflection Device" published at http://www.guitarworld.com/review-.

Jul. 11, 2012 Internet Archive of a product page in the Hipshot Products Inc. Internet store, offering the Tremsetter product, published at http://store.hipshotproducts.com/.

* cited by examiner

STABILIZING APPARATUS FOR TREMOLO SYSTEM FOR STRING INSTRUMENT

CROSS REFERENCE TO RELATED APPLICATIONS

This application claims priority from U.S. Provisional Patent Application Ser. No. 61/506,644 filed on Jul. 12, 2011, entitled "Adjustable Tremolo Spring Retention Claw for Electric Guitars", which is expressly incorporated by reference herein to the extent permitted by law.

BACKGROUND OF THE INVENTION

1. Field of the Invention

The present invention relates to supplemental devices for musical instruments, and more particularly string instruments, and more particularly guitars and more particularly electric guitars.

2. Description of Related Art

Synchronized tremolo systems have been an integral part of a large proportion of guitars for nearly 60 years. A synchronized tremolo system is a variation of a guitar's bridge, where the strings terminate at the base of the guitar's body. Synchronized tremolo systems feature a series of springs on the underside of the guitar that counteract the tension of the strings, allowing the bridge to "float" above the body. A guitarist uses a tremolo arm (commonly known as the "whammy bar") to affect the pitch of the notes being played; the player can quickly vary the tension and sometimes the length of the strings temporarily, changing the pitch to create vibrato, portamento, pitch bend and diving effects that are staple techniques of guitarists and mainstays of countless notable recordings spanning almost all genres of modern music.

A synchronized tremolo system was invented by Clarence L. Fender, as documented in U.S. Pat. No. 2,741,146 issued Apr. 10, 1955, titled "Tremolo Device for Stringed Instruments." Since that time, all such devices and improvements thereof have exhibited three inherent flaws:

a change in the tuning of one string will affect the tuning of all other strings, heavy use of the system results in a loss of tuning, and bending one string (a common gesture in guitar playing) will result in the detuning of all other strings.

Others have sought to alleviate these issues, for example Hipshot Products Inc. of 8248 State Rte 96, Interlaken, N.Y. 14847 USA (www.hipshotproducts.com) offers the Tremsetter™ device and Tremel-No LLC of P.O. Box 388, New Albany, Ohio 43054 USA (www.tremol-no.com) offers the Tremel-No™ device.

These two devices each have a number of shortcomings. Installing the Tremsetter™ requires extensive modification to the guitar's body and the device adversely effects the action of the tremolo system as a whole. The Tremel-No™ addresses the problems by merely disabling the tremolo system.

Accordingly, what is needed is a better way to address the problems with a tremolo system without disabling the tremolo system and without requiring extensive modification of a guitar's body.

SUMMARY OF THE INVENTION

The present invention is directed to this need.

According to one aspect of the present invention, there is provided an apparatus, mountable to a string instrument, for stabilizing a tremolo system, the tremolo system having a block and a plurality of tensioners extending from the block, the apparatus having a first retainer, operable to retain a first one of the plurality of tensioners in extension from the block and a second retainer, operable to retain a second one of the plurality of tensioners in extension from the block, wherein the first retainer is configured to be closer to the block than is the second retainer when the apparatus is mounted to the string instrument, whereby the first one of the plurality of tensioners is less extended than the second one of the plurality of tensioners.

The separation between the first retainer and the block may be adjustable. For example, the apparatus might include a tuning bolt adjustably coupling the first retainer and the second retainer, wherein the bolt can adjust the separation between the first retainer and the second retainer, thereby adjusting the separation between the first retainer and the block.

The separation between the second retainer and the block may be adjustable. For example, the apparatus might include a mounting screw adjustably coupling the second retainer and the string instrument, wherein the screw can adjust the separation between the second retainer and the string instrument, thereby adjusting the separation between the second retainer and the block.

The apparatus might include a plate, wherein the first retainer and the second retainer are mounted on the plate. In this regard, the first retainer and second retainer would extend from the plate in substantially the same direction and the first retainer would extend further than the second retainer. The mounting screw could adjustably couple the plate and the string instrument, wherein the screw would adjust the separation between the plate and the string instrument, thereby adjusting the separation between the retainers and the block.

The apparatus might include a first plate and a second plate, wherein the first plate and the second plate are opposite the block when the apparatus is mounted to the string instrument, wherein the first plate is between the second plate and the block, and wherein the first retainer is mounted on the first plate and the second retainer is mounted on the second plate. The tuning bolt could couple the first plate and second plate, wherein the bolt would adjust the separation between the first plate and the second plate, thereby adjusting the separation between the first retainer and the block.

According to another aspect of the present invention, there is provided a method of stabilizing a tremolo system in a string instrument, the tremolo system having a block and a plurality of tensioners extending from the block, the method including retaining a first one of the plurality of tensioners in extension from the block and retaining a second one of the plurality of tensioners in extension from the block, wherein the first one of the plurality of tensioners is retained at a lesser tension than the second one of the plurality of tensioners is retained. In some situations, this result might be arranged wherein the first one of the plurality of tensioners is retained at a lesser extension than the second one of the plurality of tensioners is retained.

The method might further include adjusting the extension of the first one of the plurality of tensioners or adjusting the extension of the second one of the plurality of tensioners.

According to still another aspect of the present invention, there is provided an apparatus for stabilizing a tremolo system in a string instrument, the tremolo system having a block and a plurality of tensioners extending from the block, the apparatus having means for retaining a first one of the plurality of tensioners in extension from the block and means for retaining a second one of the plurality of tensioners in extension from the block, wherein the means for retaining the first one of the plurality of tensioners retains the first one of the plurality of tensioners at a tension less than the means for retaining the second one of the plurality of tensioners retains the second one of the plurality of tensioners. This arrangement might be implemented such that the means for retaining the first one of the plurality of tensioners retains the first one of the plurality of tensioners at an extension less than the means for retaining the second one of the plurality of tensioners retains the second one of the plurality of tensioners.

The apparatus might further include means for adjusting the extension of the first one of the plurality of tensioners or means for adjusting the extension of the second one of the plurality of tensioners.

Further aspects and advantages of the present invention will become apparent upon considering the following drawings, description, and claims.

DESCRIPTION OF THE INVENTION

The invention will be more fully illustrated by the following detailed description of non-limiting specific embodiments in conjunction with the accompanying drawing figures. In the figures, similar elements and/or features may have the same reference label. Further, various elements of the same type may be distinguished by following the reference label with a second label that distinguishes among the similar elements. If only the first reference label is identified in a particular passage of the detailed description, then that passage describes any one of the similar elements having the same first reference label irrespective of the second reference label.

2. DETAILED DESCRIPTION OF SPECIFIC EMBODIMENTS (a) Structure of Specific Embodiments The structure of the invention will now be illustrated by explanation of specific, non-limiting, exemplary embodiments shown in the drawing figures and described in greater detail herein.

(ii) First Embodiment

FIGS. 1-13 show a tremolo stabilizing apparatus (hereinafter "stabilizer") according to a first embodiment of the present invention, generally illustrated at 100.

As shown in FIGS. 1-8, the stabilizer 100 may form a component (whether as original equipment or through retrofitting) of a synchronized tremolo system S of a string instrument, as illustrated here a guitar G, in this case an electric guitar.

Such tremolo systems S are well known, for example as taught in U.S. Pat. No. 2,741,146 issued to Clarence L. Fender on Apr. 10, 1955, titled "Tremolo Device for Stringed Instruments," and conventionally include among their other components:

a tremolo block B (sometimes called a sustain block) that pivotally supports a floating bridge (not shown) of the guitar G, and a set of tensioners T commonly springs and in particular coil springs, that engage an end of block B opposite the bridge and urge the block B against forces applied to the bridge (not shown) by strings (not shown) of the guitar G, which strings (not shown) are tensioned between the bridge (not shown) and a headstock H of the guitar G.

Broadly and in accordance with one aspect of the invention, the stabilizer 100 enables a user to retain two or more tensioners T at different tensions between the block B and the body of the guitar G. In this arrangement, at least one of the two or more tensioners T could be configured to bring the synchronized tremolo system S into equilibrium with the strings (not shown) of the guitar G while at rest, and at least another one of the two or more tensioners T could be configured to stabilize the synchronized tremolo system S as the tremolo system S is engaged by the user to temporarily vary the tension or the length of the strings (not shown) while being played so as to change the pitch of the strings to create such effects as vibrato, portamento, pitch bend or diving, while resisting flaws inherent in a conventional synchronized tremolo system S, such as:

a change in the tuning of one string affecting the tuning of all other strings, heavy use of the system resulting in a loss of tuning, and bending of one string resulting in the detuning of all other strings.

As best seen in FIGS. 7-13, in this first embodiment, the stabilizer 100 has a set of rearward retainers 102*a*, 102*b*, 102*c* affixed to a rearward plate 104 and a set of forward retainers 106a, 106b affixed to a forward plate 108.

Figures 7, 8:
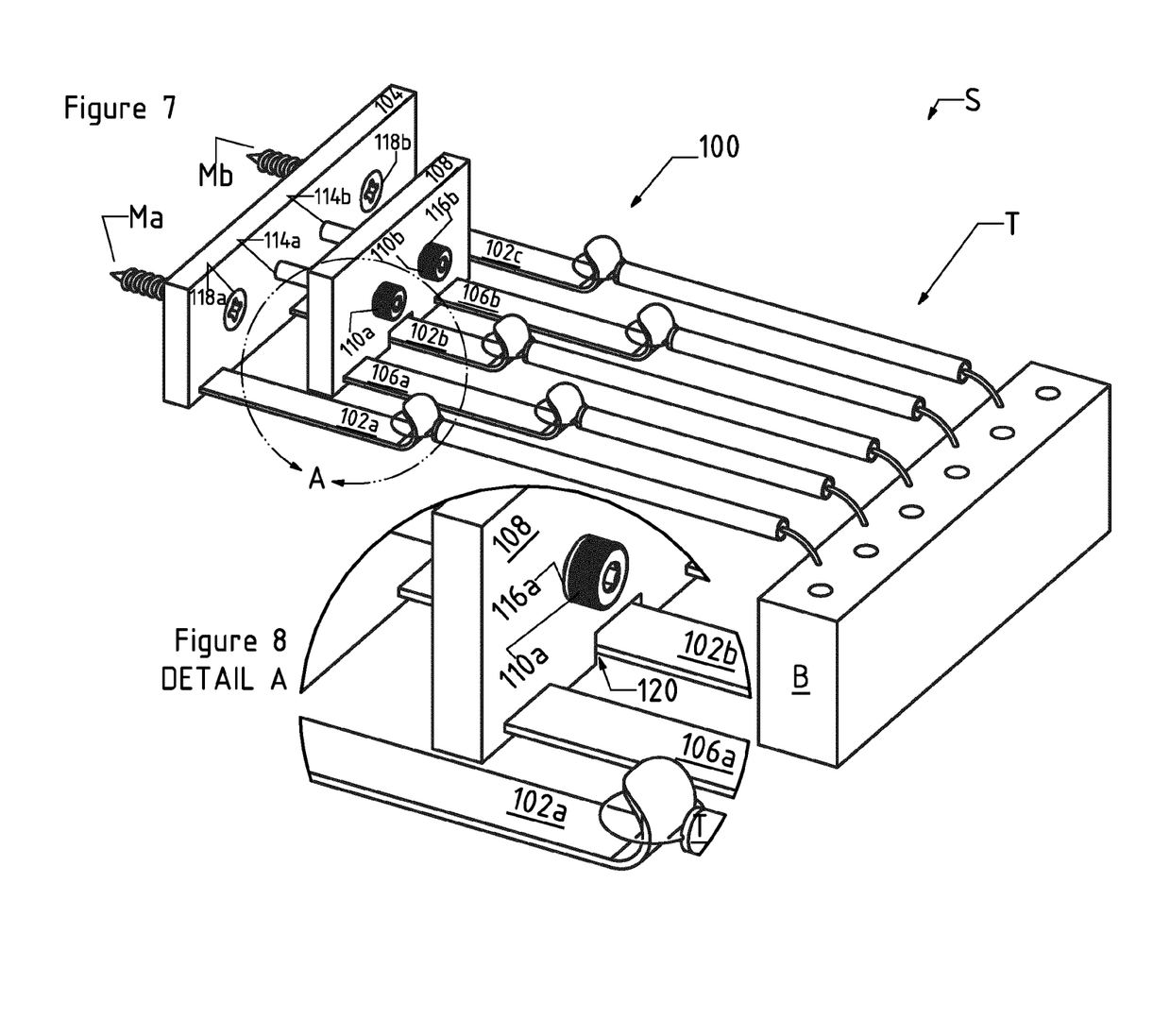
FIG. 7 is a trimetric view of the first embodiment stabilizing apparatus of FIG. 1 in situ as a component within the tremolo system.
FIG. 8 is a trimetric detail view of the stabilizing apparatus of FIG. 7.
Figure 9:
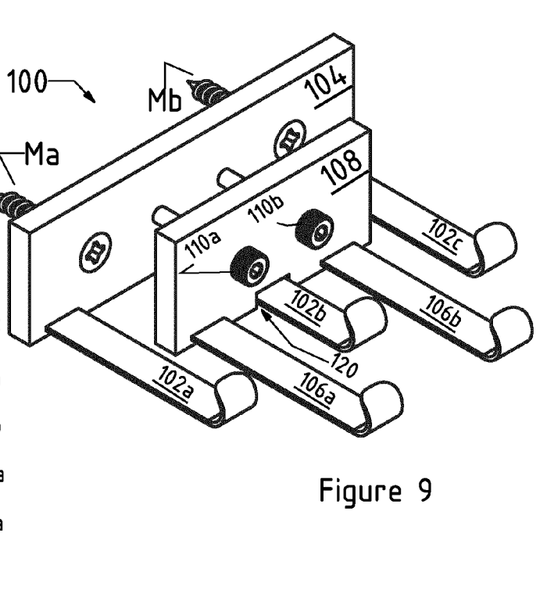
FIG. 9 is a trimetric view of the stabilizing apparatus of FIG. 7 in isolation.
Figures 10, 11, 12, 13:
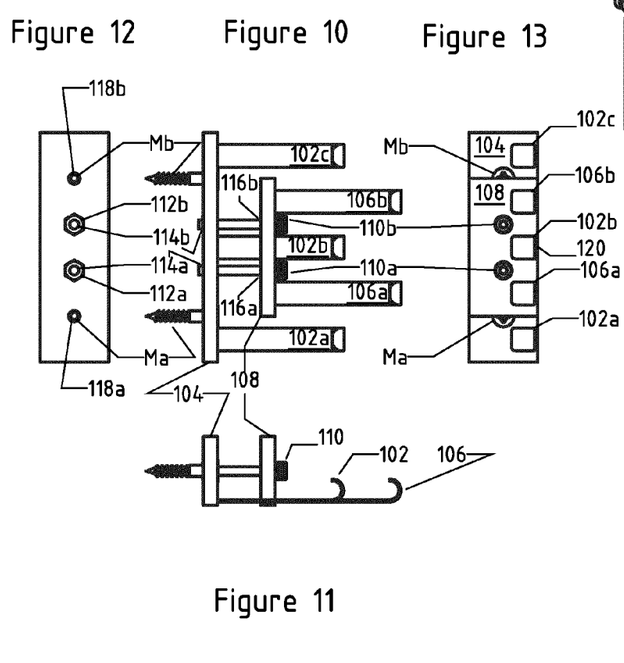
FIG. 10 is a plan view of the stabilizing apparatus of FIG. 9.
FIG. 11 is a left elevational view of the stabilizing apparatus of FIG. 9.
FIG. 12 is a back elevational view of the stabilizing apparatus of FIG. 9.
FIG. 13 is a front elevational view of the stabilizing apparatus of FIG. 9.

The rearward retainers 102 extend forward past the forward plate 108. As best seen in FIGS. 7 and 8, a rearward retainer 102a, 102c might for example extend forward adjacent an edge of the forward plate 108, for example beside, below or above the forward plate 108. A rearward retainer 102b might for example extend forward, passing through the forward plate 108, for example through a notch 120 in the forward plate 108, in this case an open notch 120; those skilled in the art will recognize however that such a notch 120 could be instead a fully enclosed aperture.

Those skilled in the art will also recognize that, although all the rearward retainers 102 and forward retainers 106 are illustrated as having the same elevation, they need not. Those skilled in the art will further recognize that although the retainers 102, 106 are illustrated as being substantially linear, they might include bends, for example, to clear obstructions.

It will be noticed that the forward retainers 106 extend further forward of the forward plate 108 than do the rearward retainers 102. Thus, when the stabilizer 100 is in place within the synchronized tremolo system S, the forward retainers 106 extend closer to the block B than do the rearward retainers 102. This arrangement provides a simple way for the stabilizer 100 to retain two or more tensioners T a different tensions between the block B and the body of the guitar G in cases where the respective tensions of the two or more tensioners T is a function of the length of their respective extensions between the block B and their respective retainers 102, 106.

It follows, more generally, that the forward retainers 106 and rearward retainers 102 respectively function as means for retaining a first one of the plurality of tensioners T in extension from the block B and means for retaining a second one of the plurality of tensioners T in extension from the block B, wherein the means for retaining the first one of the plurality of tensioners T retains the first one of the plurality of tensioners T at a tension less than the means for retaining the second one of the plurality of tensioners T retains the second one of the plurality of tensioners T and more specifically, wherein the means for retaining the first one of the plurality of tensioners T retains the first one of the plurality of tensioners T at an extension less than the means for retaining the second one of the plurality of tensioners T retains the second one of the plurality of tensioners T.

The forward plate 108 is connected to the rearward plate 104 at an adjustable separation by a pair of tuning bolts 110a, 110b and secured by a corresponding pair of nuts 112a, 112b. More particularly, the rearward plate 104 has a pair of threaded holes 114a, 114b, threaded to respectively accept and engage the pair of tuning bolts 110a, 110b. Correspondingly, the forward plate 108 has a pair of unthreaded holes 116a, 116b sized to slidably accept shank portions of the respective pair of tuning bolts 110a, 110b but to abut head portions of the pair of tuning bolts 110a, 110b. The threaded holes 114a, 114b may be counterbored or otherwise recessed to accept or engage some portion or all of the respective nuts 112a, 112b, so that the nuts 112a, 112b don't protrude fully or at all behind the rearward plate 104.

The rearward plate 104 also has a pair of unthreaded holes 118a, 118b for attaching the rearward plate 104 to the body of the guitar G, this pair of unthreaded holes 118a, 118b being sized to accept, for example, a pair of existing mounting screws Ma, Mb used to mount a conventional synchronized tremolo system to the body of the guitar G. The unthreaded holes 118a, 118b may be countersunk, counterbored or otherwise recessed to accept some portion or all of the head of the respective mounting screws Ma, Mb, so that the mounting screws Ma, Mb don't protrude fully or at all in front of the rearward plate 104.

Figures 1, 2:
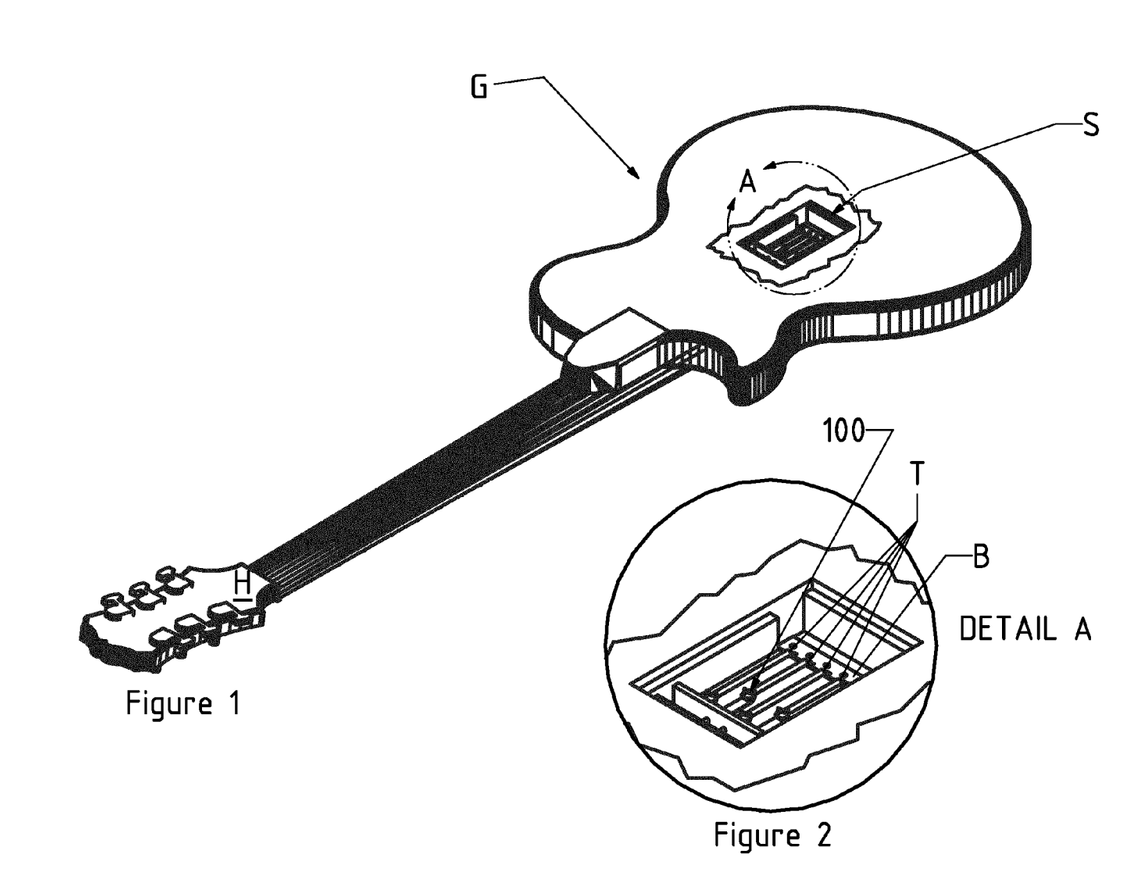
FIG. 1 is a trimetric view of the back of a guitar having a tremolo system that includes a stabilizing apparatus in accordance with a first embodiment of the present invention.
FIG. 2 is a trimetric detail view of the tremolo system of FIG. 1.
Figures 3, 4, 5A, 5B, 6:
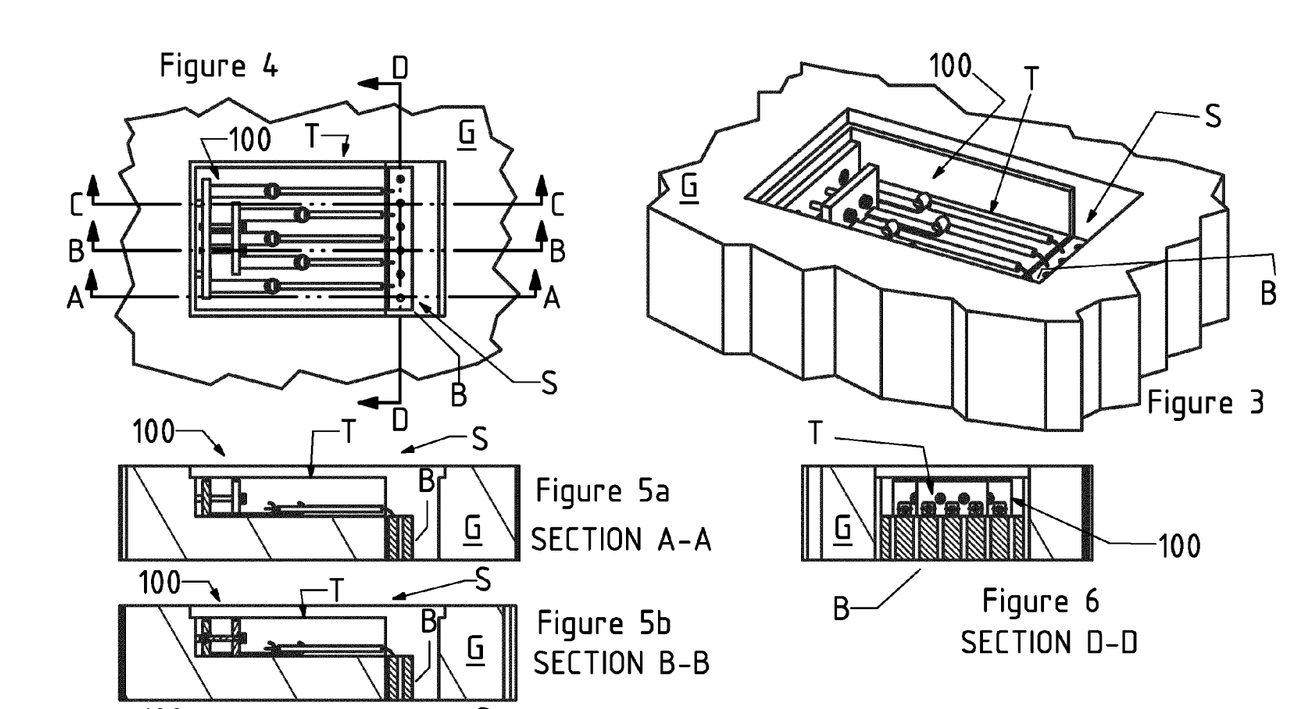
FIG. 3 is a trimetric detail view of a portion of the tremolo system of FIG. 2, in isolation.
FIG. 4 is a plan view of the tremolo system of FIG. 3.
FIG. 6 is a front elevational view of the tremolo system of FIG. 3, viewed from the cutting plane D-D shown in FIG. 4.
Figure 5C:
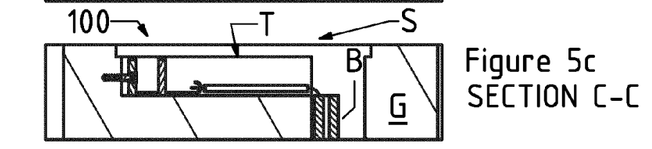
FIG. 5 is a set of three left elevational sectional views of the tremolo system of FIG. 3, viewed from the respective cutting planes A-A, B-B and C-C shown in FIG. 4.

As best seen in FIGS. 4-5, the mounting screws Ma, Mb can mount the rearward plate 104 to the body of the guitar G with a sufficient gap therebetween to receive a portion of the tuning bolts 110a, 110b as they are adjusted. Those skilled in the art will recognize that instead of or in addition to this gap, the tuning bolts 110a, 110b might be received into holes in the body of the guitar G behind the rearward plate 104 or the tuning bolts 110a, 110b might be configured to extend in front of the forward plate 108 instead of behind the rearward plate 104.

Thus, where the forward retainers 106 mounted on the forward plate 108 and rearward retainers 102 mounted on the rearward plate 104 respectively function as means for retaining a first one of the plurality of tensioners T in extension from the block B and means for retaining a second one of the plurality of tensioners T in extension from the block B, the tuning bolts 110a, 110b coupled, for example, to the nuts 112a, 112b through the threaded holes 114a, 114b in the rearward plate 104 and the unthreaded holes 116a, 116b in the forward plate 108 function as means for adjusting the extension of the first one of the plurality of tensioners, and the mounting screws Ma, Mb coupled to the body of the guitar G through the unthreaded holes 118a, 118b in the rearward plate 104 function as means for adjusting the extension of the second one of the plurality of tensioners.

In general, the stabilizer 100 is sufficiently wide, tall, and deep so as to fit into and function within the body of a standard electric guitar G that is equipped with a synchronized tremolo system S. For example, it has been found that the rearward plate 104 may be roughly 1.75"-2" in width and the forward plate 108 may be roughly 0.75"-1.10" in width. Each retainer 102, 106 may be roughly 0.5"-0.9" in length, bent to a sufficiently acute angle to retain a connector, such as a loop, at the end of a tensioner T such as standard tremolo spring. The plates 104, 108 may be roughly 0.3"-0.6" in height. The unthreaded holes 118a, 118b in the rearward plate 104 may have sufficient separation and diameter to accommodate the existing mounting screws Ma, Mb and screw holes in the body of the guitar G, for example a separation of 1.25".

The stabilizer 100 may be made of steel or any other sufficiently rigid material such as aluminum, high-strength plastic, carbon composite materials and the like. Further, the various components of the stabilizer 100 may be made of different materials, and may vary in dimensions and proportions from those illustrated.

(iii) Second Embodiment

FIGS. 14-20 show a tremolo stabilizing apparatus (hereinafter "stabilizer") according to a second embodiment of the present invention, generally illustrated at 100'.

The second embodiment stabilizer 100' is similar to the first embodiment stabilizer; however, the second embodiment stabilizer 100' has only one plate 104' and so does not have two tunable plates 104, 106. In this second embodiment, the stabilizer 100' has longer forward retainers 106' and shorter rearward retainers 102' affixed to the single plate 104'. For this embodiment, tuning between the static equilibrium and dynamic stabilizing tensions might be accomplished by altering the number, placement or more generally configuration of the tensioners T or by altering the dimensions, strengths or more generally characteristics of the tensioners T themselves.

More broadly, those skilled in the art will recognize that the use of a claw-shaped retainer 102, 106 is not specifically necessary; any arrangement sufficient to retain a spring or other tensioner T will suffice. Similarly, the use of springs specifically is not necessary; any tensioning arrangement sufficient to store and return the potential energy as needed to deliver a similar effect would suffice. Those skilled in the art will recognize that different numbers, placements, configurations, dimensions, strengths and characteristics of retainers 102, 106 and tensioners T can be applied to produce similar benefits and accomplish similar results in a similar way, without departing from the spirit of the invention, of which the foregoing and the following are merely specific embodiments being provided to describe aspects of the broader invention.

Broadly, the spirit of this invention and the benefits that it provides can be embodied in many different ways that may be either simpler or more complex than the illustrative embodiments described. For example, some benefits could be attained by simply affixing directly to a conventional set of tremolo retention claws two or more groups of tensioners T having different tensions, such that one group of tensioners T is configured to bring the synchronized tremolo system S into equilibrium with the strings of the guitar G, and a second group of tensioners T is configured to apply sufficient tension to stabilize the synchronized tremolo system S. Two additional advantages of the first and second embodiments described above is that they provide an easy way to extend identical spring tensioners T to different extension lengths so as to produce different tension forces and an easy way to fine tune the absolute and relative tensions to suit the particular guitar G, the style of music to be played and the playing characteristics of the musician.

(b) Operation of Specific Embodiments

With reference now to FIGS. 1-20, the operation of these exemplary specific embodiments of the invention will now be described.

A user would install the stabilizer 100/100' as a component of a synchronized tremolo system S of a guitar G by first disengaging the tensioners T from the tremolo system's S conventional set of claws (not shown) and unscrewing the mounting screws Ma, Mb that secure the conventional set of claws (not shown) to the guitar G body, so that the conventional set of claws (not shown) can be removed from the guitar G.

The user would then mount the stabilizer 100/100' to the guitar G body in place of the conventional set of claws (not shown), advantageously securing the stabilizer 100/100' with the same mounting screws Ma, Mb through their original holes in the body of the guitar G and the unthreaded holes in the rearward plate 118a/118a', 118b/118b'. The user would then retain the tensioners T with the retainers 102/102', 106/106', thereby integrating the stabilizer 100/100' as a component of the tremolo system S/S'.

Those tensioners T affixed to the rearward retainers 102a/102a' and 102c/102c' (and 102b/102b' if a heavy string gauge so dictates) operate to bring the synchronized tremolo system S into equilibrium, matching the tension of the strings (not shown) to those of the tensioners T, thus allowing the synchronized tremolo system S to "float".

Those tensioners T affixed to the forward retainers 106a/106a' and 106b/106b' can be set such that they are under very slight tension, stabilizing the synchronized tremolo system S during string bends and musical phrases that require heavy use of the tremolo effect.

Those skilled in the art will recognize that this result is achieved because the proximity of the forward retainers 106a/106a' and 106b/106b' to the block B—in contrast to the larger separation between the rearward retainers 102a/102a', 102b/102b' and 102c/102c' and the block B—places those tensioners T affixed to the forward retainers 106a/106a' and 106b/106b' under less tension than those tensioners T affixed to the rearward retainers 102a/102a', 102b/102b' and 102c/102c', in the case of tensioners T, such as coil springs, that are characterized by having a tension that increases as a function of extension.

(ii) First Embodiment

Depending on circumstances (for example the particular guitar G, the style of music to be played, the playing characteristics of the musician), it may be desirable to adjust the absolute or relative tension of some or all of these tensioners T.

As best seen in FIGS. 7-8, the tension of those tensioners T retained between the forward retainers 106a, 106b and the block B can be adjusted by decreasing or increasing the separation between the forward plate 108 and the rearward plate 104 with the tuning bolts 110a, 110b, thereby respectively extending or contracting those tensioners T.

Similarly, the tension of those tensioners T retained between the rearward retainers 102a, 102b, 102c and the block B can be adjusted by decreasing or increasing the gap between the rearward plate 104 and the body of the guitar with the mounting screws Ma, Mb, thereby respectively extending or contracting those tensioners T. Those skilled in the art will recognize that this adjustment will also adjust the separation between the forward plate 108 and the block B, because the forward plate 108 is connected to the rearward plate 104 by the tuning bolts; hence the tuning bolts 110a, 110b would need to be subsequently readjusted if it were desired to return the forward retainers 106a, 106b to their previous position.

Furthermore, tension can be adjusted by connecting tensioners T of differing tensions and/or tension functions between the block B and the retainers 102, 106.

(iii) Second Embodiment

Figures 14, 15:
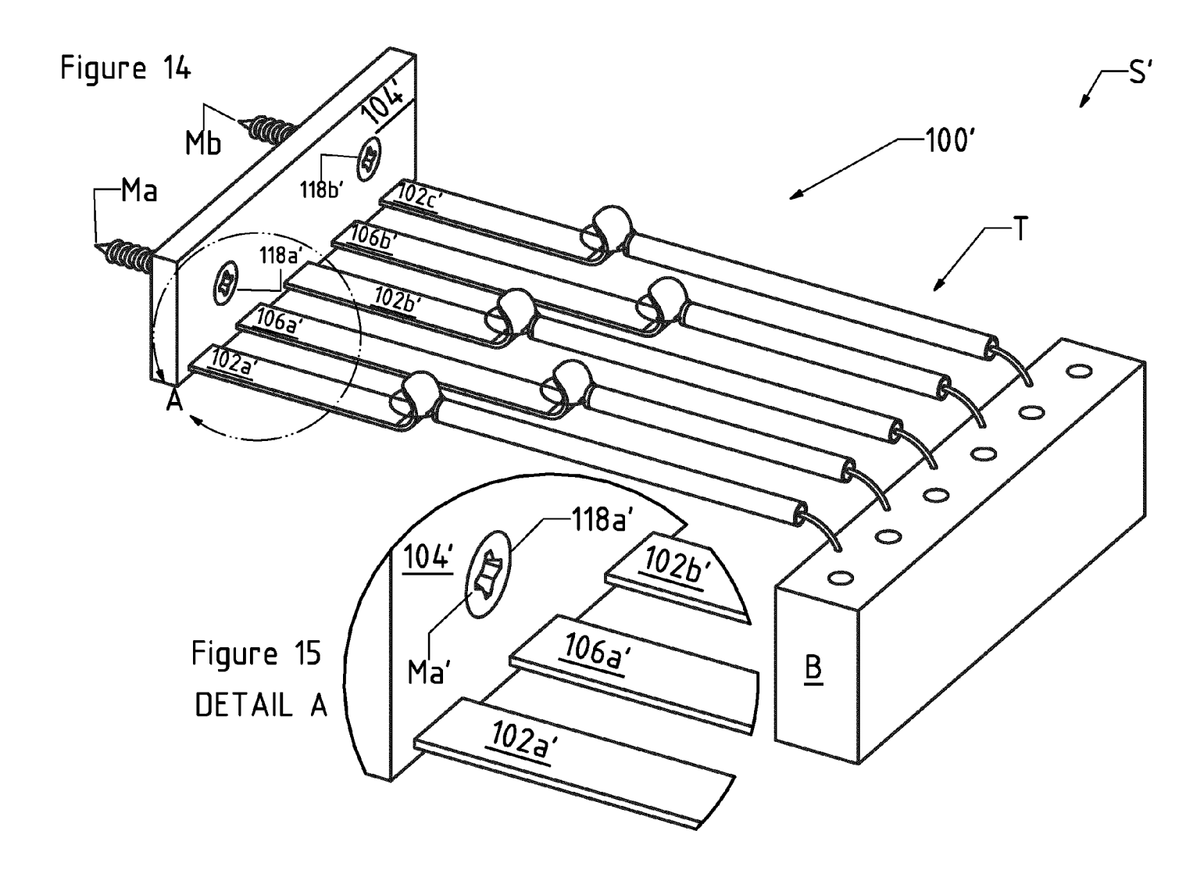
FIG. 14 is a trimetric view of the second embodiment stabilizing apparatus in situ as a component within the tremolo system.
FIG. 15 is a trimetric detail view of the stabilizing apparatus of FIG. 14.
Figures 16, 17, 18, 19, 20:
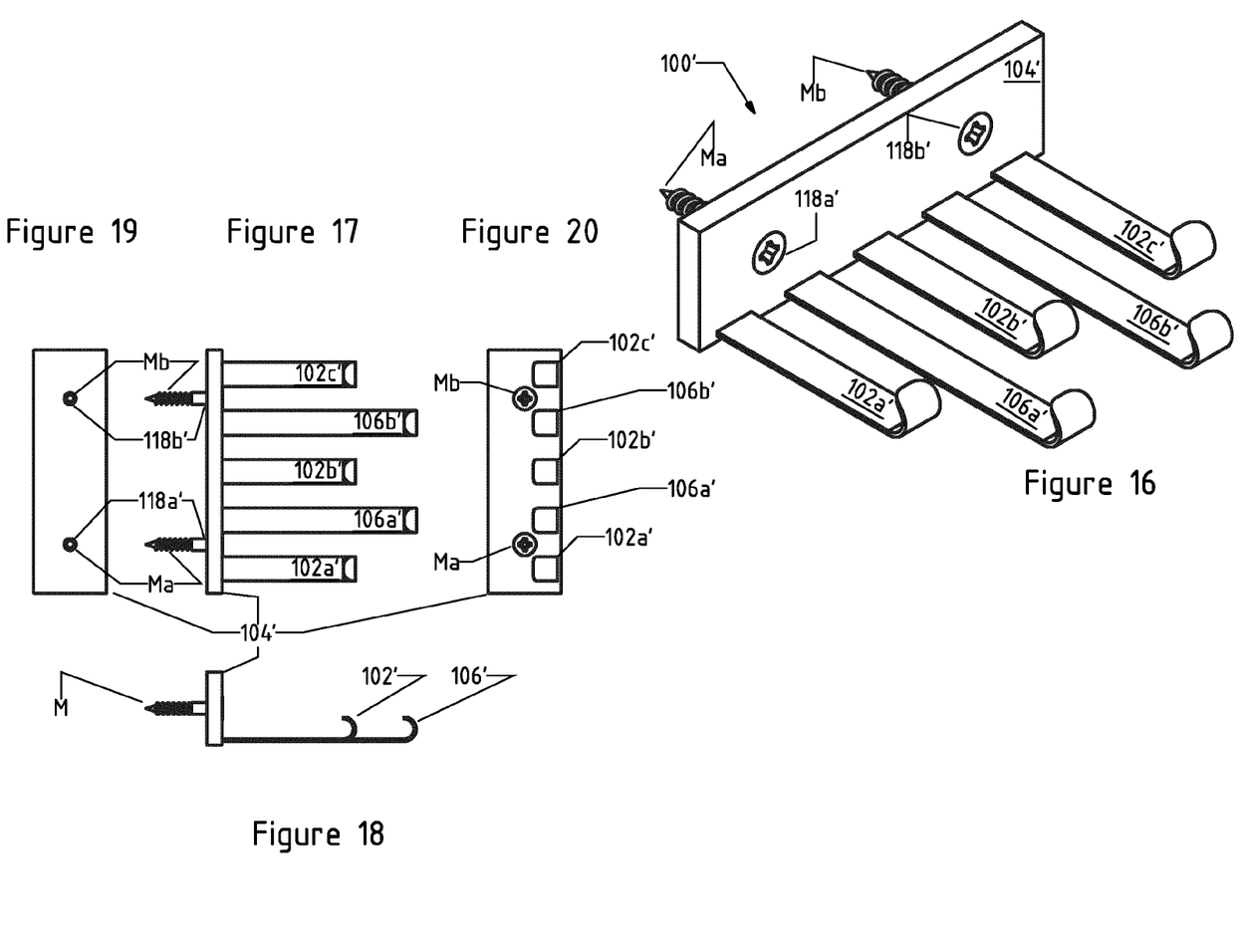
FIG. 16 is a trimetric view of the stabilizing apparatus of FIG. 14 in isolation.
FIG. 17 is a plan view of the stabilizing apparatus of FIG. 16.
FIG. 18 is a left elevational view of the stabilizing apparatus of FIG. 16.
FIG. 19 is a back elevational view of the stabilizing apparatus of FIG. 16.
FIG. 20 is a front elevational view of the stabilizing apparatus of FIG. 16.

As best seen in FIGS. 14-15, the simplified second embodiment stabilizer 100' can be used to adjust the tension of tensioners T in the second embodiment tremolo system S' using the second and third approaches described above, but not the first.

(c) Description Summary

Thus, it will be seen from the foregoing embodiments and examples that there has been described a way for a user to retain two or more tensioners T at different tensions between the block B and the body of the guitar G. In this arrangement, at least one of the two or more tensioners T could be configured to bring the synchronized tremolo system S into equilibrium with the strings (not shown) of the guitar G while at rest and at least another one of the two or more tensioners T could be configured to stabilize the synchronized tremolo system S as it is engaged by the user to temporarily vary the tension or the length of the strings (not shown) while being played so as to change the pitch of the strings to create such effects as vibrato, portamento, pitch bend or diving, while resisting flaws inherent in a conventional synchronized tremolo system S, such as:

a change in the tuning of one string affecting the tuning of all other strings,
  heavy use of the system resulting in a loss of tuning, and bending of one string resulting in the detuning of all other strings.

One advantage of the present invention is that stabilizers 100/100' in accordance with its teaching can be retrofitted into an existing electric guitar G that is equipped with a synchronized tremolo system S with no modification to the body of the guitar G. Other advantages are that the invention provides an easy way to extend identical spring tensioners T to different extension lengths so as to produce different tension forces and an easy way to fine tune the absolute and relative tensions to suit the particular guitar G, the style of music to be played and the playing characteristics of the musician.

While the foregoing written description of illustrative embodiments of the invention enables one of ordinary skill to make and use what the inventor presently considers to be the best mode thereof, those of ordinary skill will understand and appreciate the existence of variations, combinations, and equivalents of these specific embodiments, methods, and examples herein. The invention should therefore not be limited to the above described embodiments, methods, and examples, but comprises all embodiments and methods within the scope and spirit of the claims.

In particular, all quantities described have been determined empirically and those skilled in the art might well expect a wide range of values surrounding those described to provide similarly beneficial results.

While the invention has been described as having particular application for electric guitars, those skilled in the art will recognize it has wider application, for example for other acoustic guitars and more broadly other string instruments.

The invention claimed is:

1. An apparatus, mountable to a string instrument, for stabilizing a tremolo system, the tremolo system having a block and a plurality of tensioners extending from the block, comprising:
   a. a first retainer, operable to retain a first one of the plurality of tensioners in extension from the block, and
   b. a second retainer, operable to retain a second one of the plurality of tensioners in extension from the block,
   wherein the first retainer is configured to be closer to the block than is the second retainer when the apparatus is mounted to the string instrument,
   whereby the first one of the plurality of tensioners is less extended than the second one of the plurality of tensioners;
   wherein the separation between the first retainer and the block is adjustable,
   further comprising a tuning bolt adjustably coupling the first retainer and the second retainer, wherein the bolt is operable to adjust the separation between the first retainer and the second retainer, thereby adjusting the separation between the first retainer and the block.

2. An apparatus as claimed in claim 1, wherein the separation between the second retainer and the block is adjustable.

3. An apparatus as claimed in claim 2, further comprising a mounting screw adjustably coupling the second retainer and the string instrument, wherein the screw is operable to adjust the separation between the second retainer and the string instrument, thereby adjusting the separation between the second retainer and the block.

4. An apparatus as claimed in claim 1, wherein the separation between the second retainer and the block is adjustable.

5. An apparatus as claimed in claim 4, further comprising a mounting screw adjustably coupling the second retainer and the string instrument, wherein the screw is operable to adjust the separation between the second retainer and the string instrument, thereby adjusting the separation between the second retainer and the block.

6. An apparatus as claimed in claim 1, further comprising a plate, wherein the first retainer and the second retainer are mounted on the plate.

7. An apparatus as claimed in claim 6, wherein the first retainer and second retainer extend from the plate in substantially the same direction and the first retainer extends further than the second retainer.

8. An apparatus as claimed in claim 6, further comprising a mounting screw adjustably coupling the plate and the string instrument, wherein the screw is operable to adjust the separation between the plate and the string instrument, thereby adjusting the separation between the retainers and the block.

9. An apparatus as claimed in claim 1, further comprising:
   a. a first plate, and
   b. a second plate,
   wherein the first plate and the second plate are opposite the block when the apparatus is mounted to the string instrument,
   wherein the first plate is between the second plate and the block, and
   wherein the first retainer is mounted on the first plate and the second retainer is mounted on the second plate,
   further comprising a tuning bolt adjustably coupling the first plate and second plate, wherein the bolt is operable to adjust the separation between the first plate and the second plate, thereby adjusting the separation between the first retainer and the block.

10. A method of stabilizing a tremolo system in a string instrument, the tremolo system having a block and a plurality of tensioners extending from the block, the method comprising:
    a. retaining a first one of the plurality of tensioners in extension from the block, and
    b. retaining a second one of the plurality of tensioners in extension from the block,
    wherein the first one of the plurality of tensioners is retained at a lesser tension than the second one of the plurality of tensioners is retained, and
    c. adjusting the separation between the first one of the plurality of tensioners and the second one of the plurality of tensioners by adjusting a coupling of the first one of the plurality of tensioners and the second one of the plurality of tensioners.

11. A method as claimed in claim 10, wherein the first one of the plurality of tensioners is retained at a lesser extension than the second one of the plurality of tensioners is retained.

12. A method as claimed in claim 11, further including adjusting the extension of the first one of the plurality of tensioners.

13. A method as claimed in claim 12, further including adjusting the extension of the second one of the plurality of tensioners.

14. A method as claimed in claim 11, further including adjusting the extension of the second one of the plurality of tensioners.

15. An apparatus for stabilizing a tremolo system in a string instrument, the tremolo system having a block and a plurality of tensioners extending from the block, the apparatus comprising:
    a. means for retaining a first one of the plurality of tensioners in extension from the block, and
    b. means for retaining a second one of the plurality of tensioners in extension from the block, wherein the means for retaining the first one of the plurality of tensioners retains the first one of the plurality of tensioners at a tension less than the means for retaining the second one of the plurality of tensioners retains the second one of the plurality of tensioners, and c. means for adjusting the separation between the first one of the plurality of tensioners and the second one of the plurality of tensioners, wherein the means for adjusting couples the first one of the plurality of tensioners and the second one of the plurality of tensioners.

16. An apparatus as claimed in claim 15, wherein the means for retaining the first one of the plurality of tensioners retains the first one of the plurality of tensioners at an extension less than the means for retaining the second one of the plurality of tensioners retains the second one of the plurality of tensioners.

17. An apparatus as claimed in claim 16, further including means for adjusting the extension of the first one of the plurality of tensioners.

18. An apparatus as claimed in claim 17, further including means for adjusting the extension of the second one of the plurality of tensioners.

19. An apparatus as claimed in claim 16, further including means for adjusting the extension of the second one of the plurality of tensioners.

\* \* \* \* \*